United States Patent [19]
Jörg et al.

[11] Patent Number: 5,775,459
[45] Date of Patent: Jul. 7, 1998

[54] RACK-AND-PINION STEERING SYSTEM

[75] Inventors: Wolfgang Jörg, Stuttgart; Jaromir Bordovsky, Berglen; Aydogan Cakmaz, Stuttgart; Hubert Heck, Düsseldorf; Arno Röhringer, Ditzingen; Claus Gall, Fellbach; Reinhold Abt, Neuhausen; Rainer Strass, Kaarst; Karl-Hans Köhler, Wernau, all of Germany

[73] Assignee: Mercedes-Benz AG, Stuttgart, Germany

[21] Appl. No.: 577,103

[22] Filed: Dec. 22, 1995

[30] Foreign Application Priority Data

Dec. 23, 1994 [DE] Germany ............ 44 46 482.7

[51] Int. Cl.⁶ ............................................. B62D 5/04
[52] U.S. Cl. .................... 180/444; 74/388 PS; 74/422; 74/498
[58] Field of Search ........................ 180/443, 444; 280/771; 74/422, 498, 388 PS

[56] References Cited

U.S. PATENT DOCUMENTS 4,409,503  10/1983  Barthelemy .
4,576,056   3/1986  Barthelemy .................. 180/444 X
5,209,315   5/1993  Schlagmueller et al. ............ 180/444

FOREIGN PATENT DOCUMENTS

0051015A1   5/1982   European Pat. Off. .
58-110373   6/1983   Japan .
UA62-203785 12/1987  Japan .
A6144246    6/1994   Japan .

*Primary Examiner*—Anne Marie Boehler
*Attorney, Agent, or Firm*—Evenson McKeown Edwards & Lenahan, PLLC

[57]  ABSTRACT

A rack-and-pinion steering system has a rack which is toothed on two sides and cooperates with two pinions. At least one of the pinions can be axially translated in dependence on forces acting between the rack and that pinion. This axial translation controls a clutch arrangement so that a servomotor continuously rotating in one direction can in each case be nonpositively coupled to one of the pinions or uncoupled from both pinions.

15 Claims, 2 Drawing Sheets

RACK-AND-PINION STEERING SYSTEM

BACKGROUND AND SUMMARY OF THE INVENTION

The invention relates to a rack-and-pinion steering system comprising a helically-toothed rack and a pinion which cooperates therewith and is capable of limited axial translation and whose axial translation controls a clutch arrangement by which a servomotor, particularly an electric servomotor, continuously rotating in one direction of rotation can be disconnected from the pinion and from the rack in terms of drive and via different drive transmission routes dictated by the direction of the axial translation of the pinion can be coupled to the pinion or to the rack in opposite directions of operation in terms of drive.

A corresponding rack-and-pinion steering system is the subject of U.S. Pat. No. 4,409,503. Because of the helical toothing, the pinion is pushed in one or the other axial direction in dependence on the direction of the forces transmitted between the pinion and the rack. Two loose gears continuously driven in opposite directions by the electric motor are mounted on the shaft of this pinion. Between the pinion shaft and these gears are provided non-positive clutches which, through the axial translation of the pinion and the consequent axial translation of the pinion shaft, are controlled such that, on translation of the pinion in the one axial direction, the one gear, and, on translation of the pinion in the other axial direction, the other gear is non-positively coupled to the pinion shaft and thus also to the pinion. Depending on the direction of the torque acting on the pinion, the motor can accordingly transmit to the pinion a servo force in the one or the other direction without the direction of rotation of the motor having to be reversed for that purpose.

An object on which the invention is based is now that of providing a new, advantageous design by which in particular good guiding of the rack is to be made possible.

According to the invention this object is achieved in that the rack is toothed on two sides and by means of its second toothing meshes with a second pinion, and in that the clutch arrangement controlled by the axial translation of the first pinion couples the motor to the first pinion on the translation of the latter in the one direction and, on the translation of the first pinion in the other direction, couples it to the second pinion.

The invention is based on the general principle of providing toothings separate from one another on the rack, and accordingly two pinions, for the opposite directions of operation of the servomotor. In this arrangement, in addition to their drive transmission function, the two pinions can also take over the function of conjointly guiding the rack, which, because it is necessarily supported on two pinions, is given a particularly stable mounting. In particular, comparatively high torques relative to the rack axis can act on the rack without it being possible for the rack toothings to disengage from the toothings of the pinions.

This can in particular be important if steering track rods or the like, provided for the steering connection between the rack and steered wheels of the vehicle, are pivoted on the rack at a radial distance from the axis of the latter.

Other objects, advantages and novel features of the present invention will become apparent from the following detailed description of the invention when considered in conjunction with the accompanying drawings.

DETAILED DESCRIPTION OF THE DRAWINGS

Figure 1:
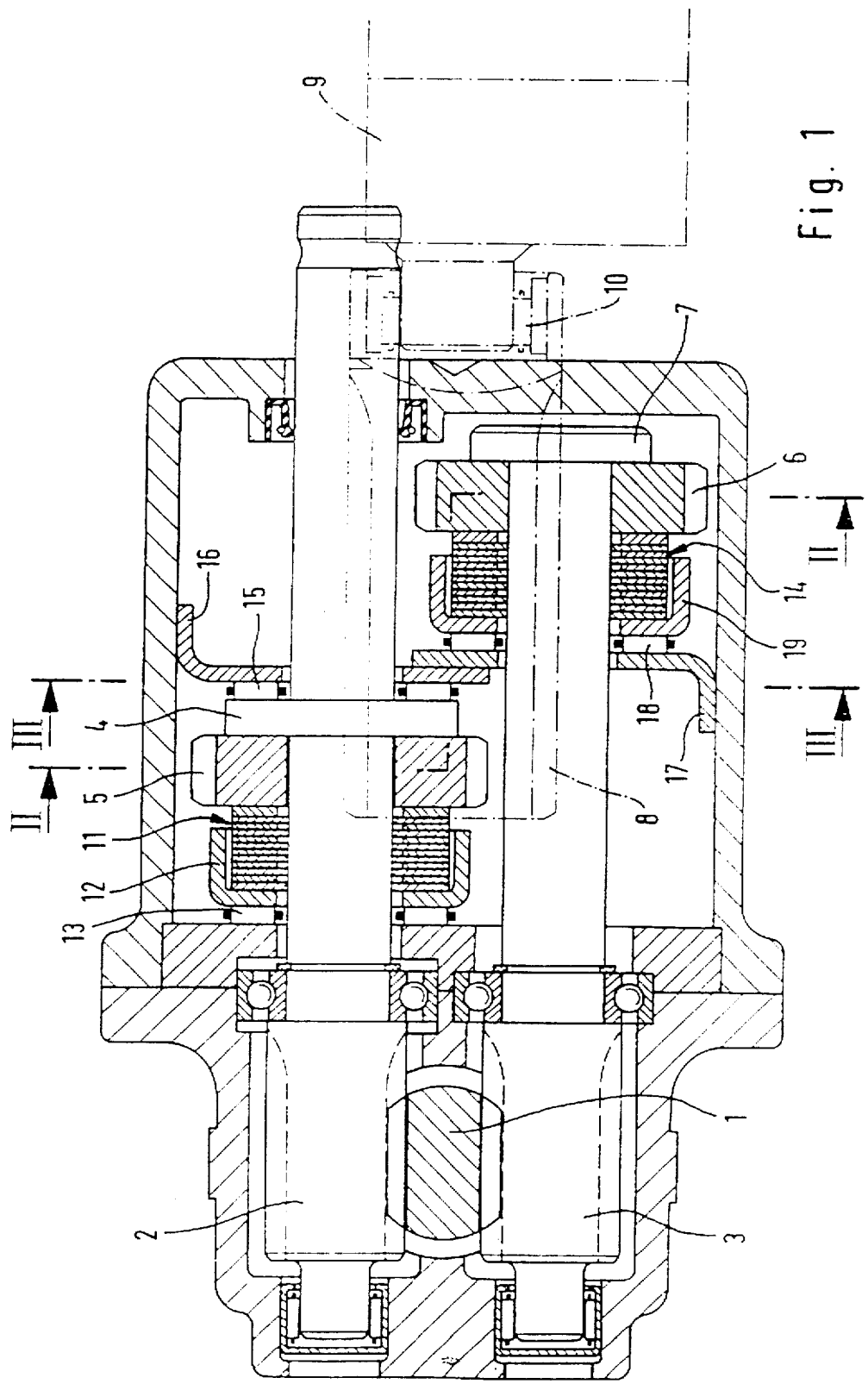
FIG. 1 shows a sectional representation of a rack-and-pinion steering system constructed according to a preferred embodiment of the invention, wherein the sectional plane of the drawing contains the axes of both pinions.

A rack 1 helically toothed on two opposite sides meshes by means of its toothing shown at the top in FIG. 1 with a first pinion 2, while a second pinion 3 engages in the toothing shown at the bottom in FIG. 1. At least the first pinion 2, which is drivingly connected via a steering-wheel shaft (not shown) to a steering wheel (not shown) of a motor vehicle, is arranged for limited longitudinal translation, so that, depending on the direction of the forces transmitted between the pinion 2 and the rack 1 and therefore also depending on the direction of the torque acting on the pinion 2, said pinion 2 is pushed to the left or the right in FIG. 1.

On the shaft of the pinion 2 a first gear 5 is rotatably mounted next to a circular disc 4 joined to said shaft for rotation therewith. A second gear 6 is mounted, axially next to a circular disc 7 mounted on the end of the shaft, on the shaft of the second pinion 3, said gear 6 being rotatable relative to the shaft of the pinion 3.

Both gears 5 and 6 mesh with a roller-shaped gear 8, which is continuously driven in a constant direction by an electric motor 9, while a freewheel 10 between the electric motor 9 and the gear 8 makes it possible to continue to turn the gear 8 when the motor 9 may be stationary or to turn it at a higher speed than would be the case when it is driven by the electric motor 9.

Arranged on that end face of the gear 5 which is remote from the circular disc 4 is a first multiple-disc clutch 11, which in the closed state makes a driving connection between the shaft of the pinion 2 and the gear 5. This multiple-disc clutch 11 is closed with a more or less powerful frictional force as soon as the pinion 2, and thus also the circular disc 4, is moved to the left in FIG. 1, the bundles of discs of the clutch 11 being compressed axially between the gear 5 and an abutment part 12 arranged on the shaft of the pinion 2 and rotatably supported by means of a thrust bearing 13 against a part which is stationary or fixed to the casing.

On that side of the gear 6 which is remote from the circular disc 7 is arranged a second multiple-disc clutch 14, which is of the same type as the multiple-disc clutch 11 and which in the closed state makes a diving connection between the gear 6 and the shaft of the pinion 3

Figure 3:
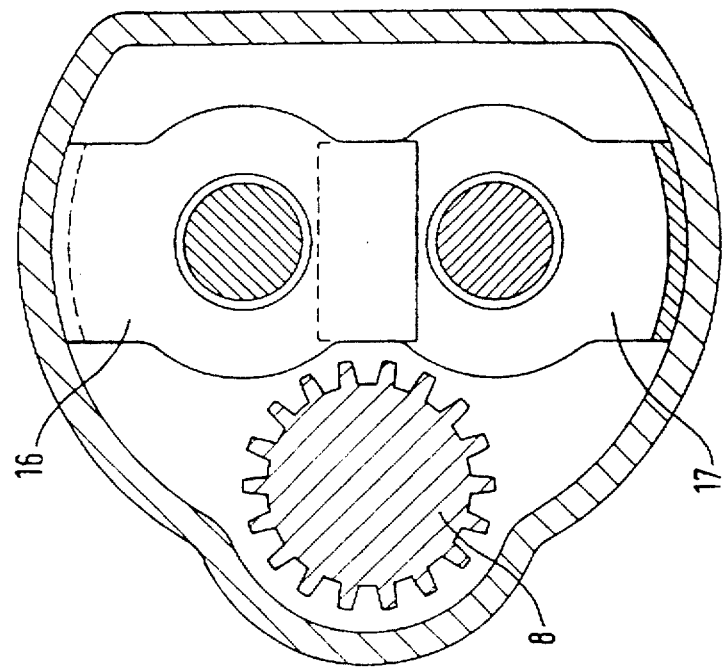
FIG. 3 shows a sectional representation corresponding to the sectional line III—III in FIG. 1.
Figure 2:
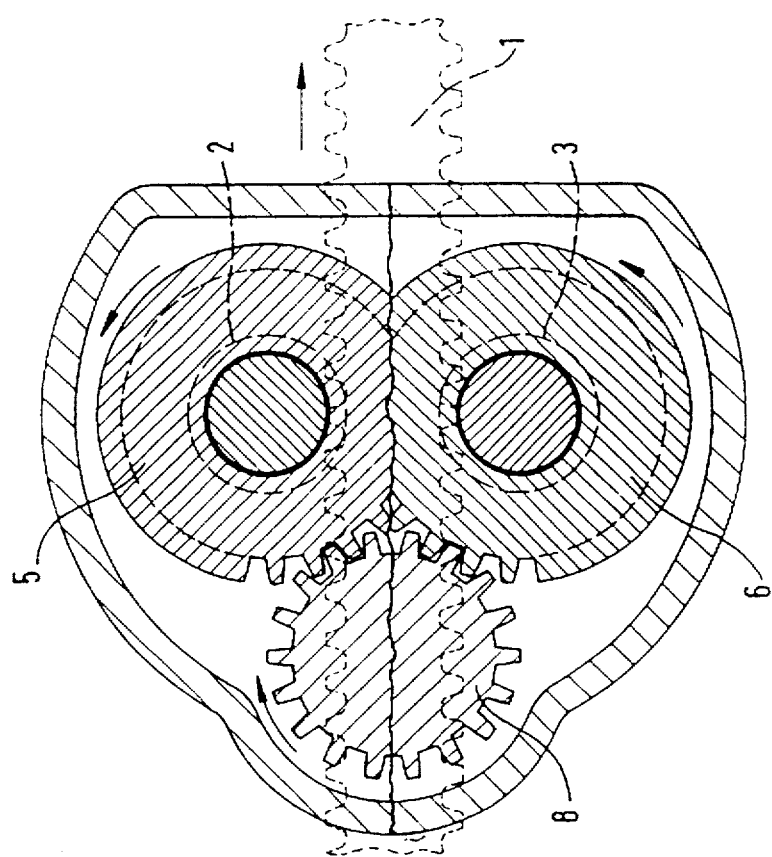
FIG. 2 shows a sectional representation corresponding to the sectional line II—II in FIG. 1.

This second multiple-disc clutch 14 is closed when the first pinion 2 and thus also the circular disc 4 are moved to the right in FIG. 1, while the circular disc 4 pushes to the right, via a thrust bearing 15, a first transmission lever 16 which is associated with the shaft of the pinion, and which then in turn pushes to the right in FIG. 3 a second transmission lever 17 which is associated with the shaft of the second pinion 3, and which in turn, with the aid of a thrust bearing 18, pushes an abutment part 19 of the multiple-disc clutch 14 axially forwards against the gear 6.

If no forces, or only extremely weak forces, are transmitted between the pinion 2 and the rack 1, no force or only an extremely weak force acts on the pinion 2 in the axial direction, so that neither the multiple-disc clutch 11 nor the multiple-disc clutch 14 can be loaded in the closing direction.

If on the other hand forces are transmitted between the pinion 2 and the rack 1, the pinion 2 is pushed in one or the other axial direction, depending on the direction of the forces transmitted, with the consequence that either the clutch 11 or the clutch 14 is closed with a more or less powerful frictional force and a driving connection is made between the electric motor 9 and the rack 1 in one or the other direction of operation.

Since the frictional force of the clutches 11 and 14 depends on the axial force acting on the pinion 2, and thus on the level of the forces acting between the pinion 2 and the rack 1, the electric motor 9 transmits to the rack 1 in each case a force which varies analogously to the forces acting between the rack 1 and the pinion 2.

In order to enable the actuating distances needed for the operation of the clutches 11 and 14 to be kept short overall, in accordance with FIG. 1, provision is preferably made for the second pinion 3 to be arranged such that it is not capable of axial translation. Accordingly, in FIG. 1 the grooved ball bearing arranged on the right of the pinion 2 is arranged in the casing for axial translation, while the corresponding grooved ball bearing of the pinion 3 is secured against axial translation.

Because of the radially stable mounting of the two pinions 2 and 3, correspondingly stable guidance, with in addition freedom from play or with little play, is ensured for the rack 1, which at the same time is in particular secured against turning about its longitudinal axis.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Rack-and-pinion steering system comprising:

a helically toothed rack having first and second toothings at respective different sides of the rack, a first pinion with teeth engaging said first toothing, said first pinion being axially movable, a second pinion with teeth engaging said second toothing, a servo motor which in use continuously rotates in one direction, and a clutch arrangement for controlling driving connections between the servo motor and the pinions in dependence on axial movement of the first pinion.

2. A rack-and-pinion steering system according to claim 1, comprising:

a first wheel rotatably disposed on a first pinion shaft of the first pinion, and a second wheel rotatably disposed on a second pinion shaft of the second pinion, said first and second wheels being continuously driven by the servo motor to rotate in the same direction of rotation, wherein said clutch arrangement includes a first clutch operable to selectively drivingly connect said first pinion shaft with the first wheel and a second clutch operable to selectively drivingly connect the second wheel with the second pinion shaft.

3. Rack-and-pinion steering system according to claim 2, wherein the first and second wheels are gear wheels which mesh with a third gear wheel driven by the servo motor.

4. Rack-and-pinion steering system according to claim 1 wherein a freewheel is arranged between the servo motor and a drive transmission to the two pinions.

5. Rack-and-pinion steering system according to claim 1, wherein said first and second toothings are arranged on respective opposite sides of the rack.

6. Rack-and-pinion steering system according to claim 1, wherein the second pinion is axially fixed.

7. Rack-and-pinion steering system according to claim 2, wherein a freewheel is arranged between the servo motor and a drive transmission to the two pinions.

8. Rack-and-pinion steering system according to claim 3, wherein a freewheel is arranged between the servo motor and a drive transmission to the two pinions.

9. Rack-and-pinion steering system according to claim 2, wherein said first and second toothings are arranged on respective opposite sides of the rack.

10. Rack-and-pinion steering system according to claim 3, wherein said first and second toothings are arranged on respective opposite sides of the rack.

11. Rack-and-pinion steering system according to claim 4, wherein said first and second toothings are arranged on respective opposite sides of the rack.

12. Rack-and-pinion steering system according to claim 2, wherein the second pinion is axially fixed.

13. Rack-and-pinion steering system according to claim 3, wherein the second pinion is axially fixed.

14. Rack-and-pinion steering system according to claim 4, wherein the second pinion is axially fixed.

15. Rack-and-pinion steering system according to claim 5, wherein the second pinion is axially fixed.

* * * * *